Patented July 21, 1925.

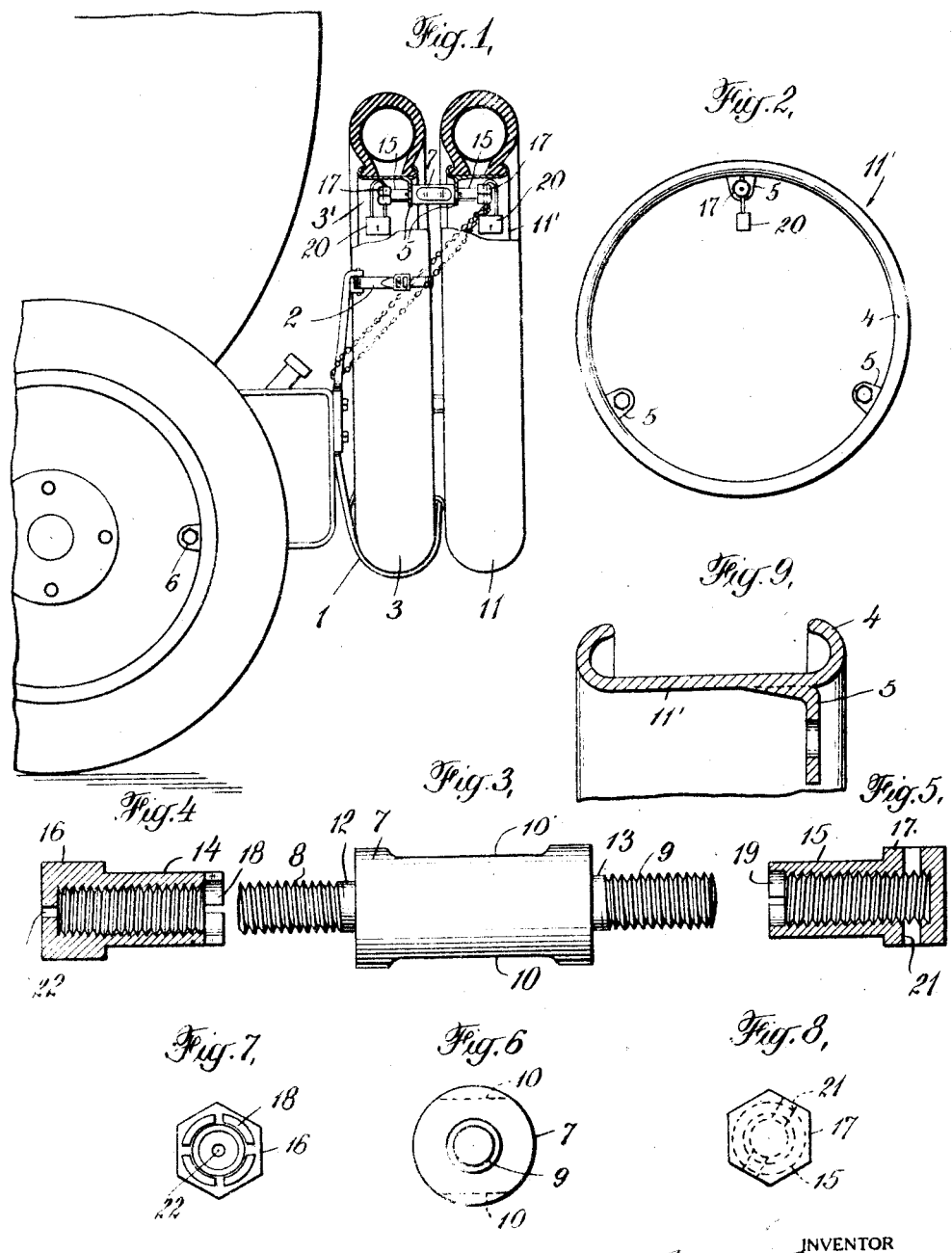

1,546,365

UNITED STATES PATENT OFFICE.

JAMES BINDON, OF NEWPORT, RHODE ISLAND.

SPARE-TIRE SUPPORT.

Application filed May 8, 1924. Serial No. 711,780.

*To all whom it may concern:*

Be it known that I, JAMES BINDON, a citizen of the United States, residing at Newport, in the county of Newport, State of Rhode Island, have invented certain new and useful Improvements in Spare-Tire Supports; and I do hereby declare the following to be a full, clear, and exact description of the invention, such as will enable others skilled in the art to which it appertains to make and use the same.

This invention relates to spare tire supports and more particularly to that type of spare tire support which is used for the purpose of fixing the rim of one spare tire to that of another, whereby any additional support for the second tire is rendered unnecessary.

My invention is particularly useful in connection with the relatively new type of tire rim which is provided with a plurality of lugs projecting radially towards the center or axis of the rim. These lugs, two or three of which are spot welded or otherwise fixed to the inner face of the rim are arranged along one edge of the rim only and serve as a means for securing this edge of the rim firmly to the vehicle wheel. These lugs, which are secured to the wheel by means of stud bolts, take the place of the loose lugs or clamps which were formerly used; and it has been found that the lugs fixed to the tire rim are a much more satisfactory means of securing the rim to the wheel than the loose lugs or clamps heretofore employed.

It is the usual practice to provide an automobile with a support, either secured to the back of the car or mounted on one of the running boards, adapted to hold a single spare tire. Whenever it becomes necessary to carry a second spare tire an additional tire support must be provided. The expense and delay incident to having a second complete tire support constructed and secured to the automobile are very considerable and invariably present an undesirable problem. In order to avoid this condition I have devised a simple and inexpensive means for securing a second spare tire to the rim of the spare tire for which a complete support is usually provided, and in this way avoid the necessity of constructing a second self sustaining support for the additional tire.

My improved tire support is adapted to cooperate with the lugs provided on the newer type of tire rims above described so as to secure two rims together. In general this is accomplished by clamping the lugs on one rim to several spacing members which are in turn clamped to the lugs on the other rim.

My invention includes a number of improvements whereby the tire support is rendered very efficient and reliable; and it can be made to include a simple and inexpensive means for safely locking the additional spare tire so as to prevent theft of this tire. The various objects and advantages of my invention will be apparent upon considering the following detailed description which is to be taken in conjunction with the accompanying drawings in which, Fig. 1 is a fragmentary elevation, partly in section, of the rear portion of an automobile showing the improved spare tire support applied thereto.

Fig. 2 is an elevation of a tire rim having the improved support applied thereto.

Fig. 3 is an enlarged view of the improved spare tire support showing the construction thereof.

Figs. 4 and 5 are enlarged sectional views of the nuts forming part of the improved support.

Fig. 6 is an end view of the supporting member shown in Fig. 3.

Fig. 7 is an end view of the shank portion of the nut shown in Fig. 4.

Fig. 8 is an end view of the head of the nut shown in Fig. 5.

Fig. 9 is an enlarged transverse sectional view of the type of rim shown in Figures 1 and 2.

As mentioned above, Figure 1 shows the rear portion of an automobile having an ordinary spare tire support, 1 secured to the vehicle. This tire support is ordinarily secured to the back of the vehicle although it is sometimes placed on one of the running boards or near one of the front fenders. The particular support shown in Figure 1 comprises a bottom portion adapted to fit around the bottom of the tire and an upper portion carrying a strap 2 which may be secured around the tire 3 so as to hold the tire firmly in position in its support. While I have shown this particular form of spare tire support, yet it will be understood that my invention can be employed in connection with any type of tire support adapted to carry one or more tires. The tire indicated at 3 in Figure 1 may be chained or otherwise held in position in the usual manner so as to prevent theft of the tire, or reliance can be placed upon locking means hereinafter described in connection with my improved support.

By referring to Figures 1, 2 and 9 it will be noticed that the rim 4 is of the modern type having a plurality of lugs 5 thereon. These lugs are secured to the rim in any ordinary manner as by spot welding or brazing. The portion of the lug which is fixed to the rim is usually tapered, as shown in Figure 9, so as to facilitate the application of the rim to the wheel of the vehicle. Each of the lugs 5 is provided with a hole therein so that the lugs and consequently the rim can be secured in place on the wheel by inserting stud bolts 6 through the holes in the lugs and tightening the bolts.

I have found that these lugs 5 on the modern type of rim just described can be used to advantage as a means for supporting an extra spare tire. The means which I use to bring about this result is best shown in Figures 3, 4 and 5. In general this means includes a spacing member shown in Figures 3 and 6, comprising a central cylindrical portion 7 having threaded studs 8 and 9 at each end thereof and integral therewith. I prefer to flatten at least two sides of the cylindrical central portion 7 as shown at 10 so as to make it possible to grip this portion with an ordinary wrench. I also prefer to make this spacing member out of a single piece of steel, but it is of course, possible to vary this construction to the extent of using a central cylindrical portion separate from the threaded portions. The nuts shown in figures 4 and 5 are provided for the threaded studs 8 and 9 of the spacing members. These nuts serve as a means for clamping the spacing member to the perforated lugs carried by the tire rims.

The method of applying my improved tire support can be best understood by referring to Figure 1. The spacing member is brought into such a position that one of the threaded studs 8 and 9 projects through the opening in one of the lugs 5 on the rim 3' of the tire carried in the support 1. One of the nuts is then screwed onto the stud projecting through this lug so as to clamp the lug firmly against the end of the enlarged central portion 7 of the spacing member. It is, of course, evident that the spacing member can be applied to the inner rim 3' before this rim is mounted in the support 1. It will also be understood that a spacing member is provided for each of the lugs on the rim 3', the several spacing members being secured to these lugs in the manner just described.

The rims shown in Figures 1 and 2 are each provided with three lugs and accordingly after three of the spacing members have been applied to the rim 3' in the manner just described, the second tire 11 is lifted into position so that the lugs carried by the rim 11' fit over the projecting ends of the spacing members. It will be noticed that the lugs 5 on each rim are provided along one edge thereof only and that the rims 3' and 11' are so placed that the edges of these rims which carry the lugs 5 are opposite each other. The operation of securing the second rim in position is completed by applying the second nut to each of the projecting ends of the spacing members 7 so as to clamp the lugs 5 on the rim 11' against the corresponding ends of the central enlarged portions of the spacing members. When the three nuts have been applied to the outer ends of the spacing members, the additional tire 11 is firmly fixed to the rim 3' and hence to the vehicle. The spacing members, by virtue of which the second tire is held in position, serve as a means for holding the two tires at just the proper distance apart to prevent them from chafing.

Upon considering the forces developed in the improved tire support when it is in use, it is apparent that the maximum stress comes at the point where the lugs 5 on the rims 3' and 11' engage the spacing members. It is because of this fact that I prefer to construct each of the spacing members out of a single piece of metal; and in order to further guard against breakage, I prefer to leave a portion of each of the studs 8 and 9 unthreaded, this portion being that adjacent to the central cylindrical portion of the spacing member as shown at 12 and 13. Another means for increasing the strength of the device at these critical points comprises the construction of the ends of the shank portion 14 and 15 of the nuts shown in Figures 4 and 5. By referring to these figures it will be noticed that the inner faces of the ends of the shank portions 14 and 15 are hollowed out to form cylindrical surfaces of somewhat greater diameter than that of the threaded portion. This leaves a small clearance between the ends of the shanks 14 and 15 and the portions 12 and 13 of the spacing member, or between the surfaces 18 and 19 and the threads on the studs 8 and 9, as the case may be.

In order to prevent the nuts from working loose I prefer to provide a plurality of notches in the ends of the shanks 14 and 15 as best shown in Figures 4 and 5. By providing these saw cuts or notches, a number of sharp corners are formed which are forced into the metal of the lugs 5 on the rims 3' and 11'. I have found that this is a very effective means for preventing the nuts from working loose.

I have provided a simple and effective means for locking the second tire rim to the first rim. This means comprises an ordinary padlock 20, shown in Figures 1 and 2, the shank of which is adapted to pass through a transverse opening 21 in the head 17 of one of the nuts. I prefer to construct the nuts so that the openings 21 in the heads thereof are located at such a point that the distance between these openings and the ends of the clamps is greater than the length of the studs 8 and 9, so that the padlock does not come into contact with the ends of the studs 8 and 9. When this construction is used, the padlock does not prevent turning of the nut by virtue of any cooperation between the lock and the studs 8 and 9; this result is effected by virtue of the cooperation between the lock and the rim proper as is evident upon considering Figure 1. When the nuts are tightened the heads of the nuts are located at a considerable distance in from the edges of the rims and when the padlock is applied the nuts cannot be turned because the padlock comes into contact with the rim and prevents this turning movement.

If it is so desired, both of the nuts employed on one of the spacing members can be provided with openings 21 therein as shown in Figure 1, for example, so that a padlock can be applied to each of these nuts. Ordinarily it will be found that the lock on one of them will prevent theft of the tires inasmuch as it is comparatively difficult to remove the inner nut.

If the tire 3 is not locked to the automobile in any manner it may be desirable to provide a chain secured to the tire support 1 and passing through the padlock 20 as indicated in Figure 1. This prevents the removal of both tires as a unit. It will be understood that it is not necessary to provide a padlock on more than one of the spacing members and therefore not more than one or two of the nuts need be provided with the transverse openings 21 through which the shaft of the padlock passes.

Where the nuts for the spacing member are not provided with the transverse openings 21, I prefer to make a small longitudinal opening 22 in the head of each nut to permit the escape of grease. Before these nuts are screwed into position a small quantity of grease can be inserted into the inside and when the nuts are screwed on any excess grease is expelled through the openings 22. This excess grease can be wiped off and the grease remaining within the openings 22 seals the ends of the nuts and protects the nuts and the studs 8 and 9 against rusting.

It is to be understood that the various details of construction of my improved tire support can be modified without departing from the spirit of my invention which is not limited to the particular embodiment illustrated and described, but includes such modifications thereof as fall within the scope of the appended claims. Furthermore, it is evident that my improved tire support can be used in connection with a support fixed to the motor vehicle instead of in connection with a rim carried by a support attached to the vehicle and therefore my invention is not limited in this respect.

I claim:

1. In a device of the type described, the combination of a support, means for fixing said support to a motor vehicle, a spacing member, means for fixing said member to said support, a tire rim having a perforated lug thereon, said member being adapted to project through the lug on said rim, and means for fixing said member and the lug on the said rim together whereby the rim is secured to the vehicle.

2. In a device of the type described, the combination of a tire rim having a lug thereon, means for fixing said rim to a motor vehicle, a one piece spacing member, means for fixing said member to the lug on said rim, a second tire rim having a perforated lug thereon, said member being adapted to project through the lug on said second rim, and means for fixing said member and the lug on said second rim together, whereby the second rim is secured to the vehicle.

3. In a device of the type described, the combination of a tire rim having a perforated lug thereon, means for securing said rim to a motor vehicle, a one piece spacing member having a shoulder and a portion adapted to project through the perforated lug on said rim until the shoulder engages the lug, means for fixing said member to said lug, a second tire rim having a perforated lug thereon adapted to be fitted over one end of said spacing member, and means for fixing said member and the lug on said second rim together, whereby the second rim is secured to the vehicle.

4. In a device of the type described the combination of a tire rim having a perforated lug thereon, means for securing said rim to a motor vehicle, a spacing member having threaded ends, one of which is adapted to project through the lug on said rim, means for fixing this end of said member to the lug on said rim, a second tire rim having a perforated lug thereon adapted to be fitted over the other end of said member, and a nut adapted to be screwed onto this last mentioned end of said member for fixing said member and the lug on said second rim together, whereby the second rim is secured to the vehicle.

5. In a device of the type described the combination of a tire rim having a perforated lug thereon, means for securing said rim to a motor vehicle, a spacing member having threaded ends, one of which is adapted to project through the lug on said rim, means for fixing this end of said member to the lug on said rim, a second tire rim having a perforated lug thereon adapted to be fitted over the other end of said member, and a nut adapted to be screwed onto said last mentioned end of said member for fixing said member and the lug on said second rim together whereby the second rim is secured to the vehicle, and means cooperating with the said nut and the second rim for locking this nut.

6. In a device of the type described the combination of a tire rim having a perforated lug thereon, means for securing said rim to a motor vehicle, a spacing member having threaded ends, one of which is adapted to project through the lug on said rim, means for fixing this end of said member to the lug on said rim, a second tire rim having a perforated lug thereon and adapted to be fitted over the other end of said member, a nut adapted to be screwed onto said last mentioned end of said member for fixing said member and the lug on said second rim together whereby the second rim is secured to the vehicle, said nut comprising a threaded shank and a head having an opening formed therein transversely thereof, and means extending through said opening and cooperating with said second rim for locking said nut in position.

7. In a device of the type described the combination of a support having a lug thereon, means for securing said support to a motor vehicle, a spacing member, means for fixing said member to the lug on said support, a tire rim having a perforated lug thereon and adapted to be fitted over one end of said member, means for fixing said member and the lug on said rim together whereby the rim is secured to the vehicle, and means cooperating with said last mentioned means and said rim for locking this last mentioned means.

8. A support for a spare tire rim having radially projecting perforated lugs thereon, comprising a cylindrical spacing member having a threaded stud on each end thereof integral therewith, means for fixing one end of said member to a support and means for fixing the other end of said member to a lug carried by the tire rim.

9. A support for a spare tire rim having radially projecting perforated lugs thereon, comprising a spacer member having a central cylindrical portion and two threaded ends of smaller diameter than the central portion, means cooperating with one threaded end of said member for clamping the cylindrical portion thereof to a support and means cooperating with the other threaded end of said member for clamping a lug on the tire rim against the corresponding end of the central cylindrical portion of said member.

10. A support for a spare tire rim having radially projecting perforated lugs thereon, comprising a spacer member having a central cylindrical portion and two threaded ends of smaller diameter than the central portion, means cooperating with one threaded end of said member for clamping the cylindrical portion thereof to a support and a nut cooperating with the other threaded end of said member to clamp a lug on a tire rim against the corresponding end of the central cylindrical portion of said member, the said nut having a means thereon for gripping the lug on the tire rim so as to prevent the nut from working loose.

11. A support for a tire rim having radially projecting perforated lugs thereon, comprising a straight cylindrical spacing member having integral threaded ends of smaller diameter than the central portion of said member, means for clamping one end of said central portion to a support, a nut adapted to cooperate with the other end of said member to clamp a lug on a tire rim against the corresponding end of the central portion of said member, said nut having an opening extending through the head thereof at right angles to the axis of said nut, and locking means adapted to extend through the opening in said nut and cooperating with the tire rim to prevent the removal of said nut.

12. A support for a tire rim having radially projecting perforated lugs thereon, comprising a straight cylindrical spacing member having integral threaded ends of smaller diameter than the central portion of said member, means for clamping one end of said central portion to a support, a nut adapted to cooperate with the other end of said member to clamp a lug on a tire rim against the corresponding end of the central portion of said member, the said nut having notches cut in the end thereof whereby the nut is caused to grip the metal with which it comes in contact so as to prevent the nut from working loose.

13. A support for a tire rim having radially projecting perforated lugs thereon, comprising a straight cylindrical spacing member having integral threaded ends of smaller diameter than the central portion of said member, means for clamping one end of said central portion to a support, a nut adapted to cooperate with the other end of said member to clamp a lug on a tire rim against the corresponding end of the central portion of said member, the said nut having notches cut in the end thereof whereby the nut is caused to grip the metal with which it comes in contact so as to prevent the nut from working loose, the notched end of the nut having a cylindrical inner surface of greater diameter than the threaded portion of the nut.

14. A support for spare tire rims having radially extending lugs, comprising a spacing member of relatively large diameter, a threaded member of relatively small diameter integral with said member of relatively large diameter and threaded means for clamping said spacer member to a support and for clamping a lug on a tire rim to said spacing member, the said parts being constructed so that the spacing member can be secured to a support by turning the spacing member and holding the threaded means stationary.

15. A device of the type described, comprising the combination of a support having a lug thereon, means for fixing said support to a motor vehicle, a spacing member, means for fixing said member to the lug on said support, a tire rim having a perforated lug thereon adapted to be fitted over one end of said member, means for fixing said member and the lug on said rim together whereby the rim is secured to the vehicle and a means for locking the means for fixing said member and the lug on the said rim together, and for locking the means for fixing said support to the vehicle.

16. A support for a tire rim, including a spacing member having a threaded stud thereon, and a nut for said stud, for clamping the spacing member to the rim, said nut having an opening in the head thereof for permitting the escape of grease.

17. A support for tire rims having radially extending perforated lugs thereon, comprising a spacing member having a central cylindrical portion of relatively large diameter and having a threaded stud at each end thereof and integral therewith, the said studs having a relatively small diameter, a nut for each of said studs adapted to clamp a lug on a tire rim against the corresponding end of the central cylindrical portion of said spacing member, the said central cylindrical portion having at least two sides thereof cut away to form plain surfaces adapted to be engaged by a wrench.

In testimony whereof I affix my signature.

JAMES BINDON.